United States Patent [19]

Mulholland et al.

[11] Patent Number: 5,654,905
[45] Date of Patent: Aug. 5, 1997

[54] SYSTEM FOR TRACKING COMPUTER USAGE TIME

[75] Inventors: Candace Mulholland, Foothill Ranch; Jason T. Kurashige, Irvine, both of Calif.

[73] Assignee: AST Research, Inc., Irvine, Calif.

[21] Appl. No.: 528,945

[22] Filed: Sep. 15, 1995

[51] Int. Cl.⁶ .................................................. G06F 1/14
[52] U.S. Cl. ........................ 364/569; 364/281.3; 395/557
[58] Field of Search ..................................... 364/552, 569, 364/280, 281.3, 264, 286.4, 925.2; 371/29.1; 395/650, 700, 550, 557-750

[56] References Cited

U.S. PATENT DOCUMENTS

5,390,324  2/1995  Burckhartt et al. ..................... 395/375
5,557,784  9/1996  Dayan et al. ........................... 395/550

*Primary Examiner*—James P. Trammell
*Assistant Examiner*—Craig Steven Miller
*Attorney, Agent, or Firm*—Knobbe, Martens, Olson & Bear, LLP

[57] ABSTRACT

A system tracks the amount of time a computer system has operated, after its delivery to a new user. The system includes a terminate and stay resident (TSR) program which is loaded each time the computer is booted. The program counts system timer ticks and, at predetermined intervals but only when the operating system is idle, logs the amount of time counted in a log file located on the computer's local hard drive.

4 Claims, 6 Drawing Sheets

SYSTEM FOR TRACKING COMPUTER USAGE TIME

BACKGROUND OF THE INVENTION

1. Field of the Invention

This invention relates to systems for tracking the amount of time a computer has been operating. More specifically, this invention relates to background executing programs that track the amount of time a computer has operated after it has been delivered to a new user.

2. Description of Related Art

Computer sellers are sometimes asked to accept returned computer systems. Because the seller has no way of knowing how much the otherwise new system has been used, it is often forced to resell the computer as a used system, which of course commands a lower price. Were there some method of tracking the amount of time that a new computer system has been operated before its return, the seller could resell returned systems that were used infrequently or not at all for a much higher price.

There is thus a need for a method or system for tracking the amount of time a new computer system has been operated, after it has been delivered to a new user.

SUMMARY OF THE INVENTION

The present invention is a system for tracking the amount of time a computer has been operated, after the computer has been delivered to an end user. The system comprises a time logging program which is loaded into the computer's memory, and which is activated in a background mode each time the computer is booted. The time logging program counts timer interrupts issued by the computer's timer, and updates a log file located on the computer's hard drive at predetermined intervals. The log contains data representing the amount of time the computer has been on. Because the program operates in background mode, its execution is virtually transparent to the user, thus providing an elegant and unobtrusive method for tracking the amount of time the computer has been used. In the preferred embodiment, the time logging program is a DOS-based Terminate and Stay Resident (TSR) program.

In accordance with another aspect of the present invention, the time logging program intercepts idle interrupts, which are issued by the computer's operating system whenever it is idle. The time logging program updates the log file only during these idle periods, thus further ensuring that the program's operation does not interfere with the computer's other tasks.

Moreover, in the preferred embodiment of the present invention the log file and the executable file are hidden files, making them invisible to the casual user.

The time logging program ceases operating after it has counted a predetermined number of timer interrupts. In addition, the time logging program counts the number of times the computer executes the TSR program, which generally corresponds to the number of times the computer is booted, and likewise ceases operating after it has counted a predetermined number of boots.

The time logging program can be activated with an input parameter to disable further operation.

DETAILED DESCRIPTION OF THE PREFERRED EMBODIMENT

Figure 1:
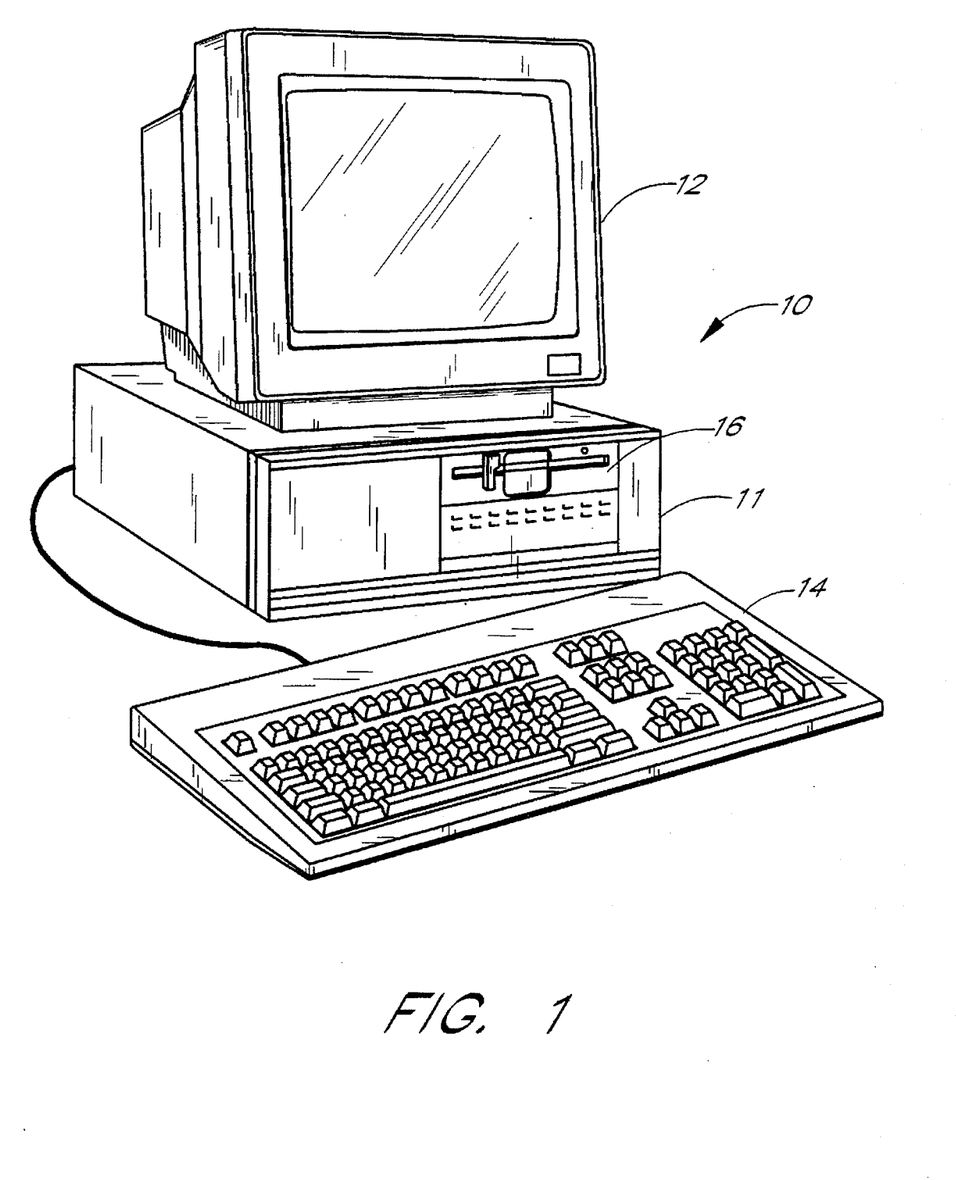
FIG. 1 is perspective view of a computer system, into which the present invention may be incorporated.

FIG. 1 illustrates an exemplary computer system 10 into which the present invention is advantageously incorporated. The computer system 10 comprises a base unit 11, a monitor 12, a keyboard 14, and a flexible disk drive 16. The keyboard 12 provides user access to the computer system 10, and the monitor 14 displays data and other information generated by the computer system 10. The flexible disk drive 16 permits a user to transfer software and data to and from the computer system 10. The computer system 10 may advantageously include other peripheral devices, such as, for example, a printer (not shown).

Figure 2:
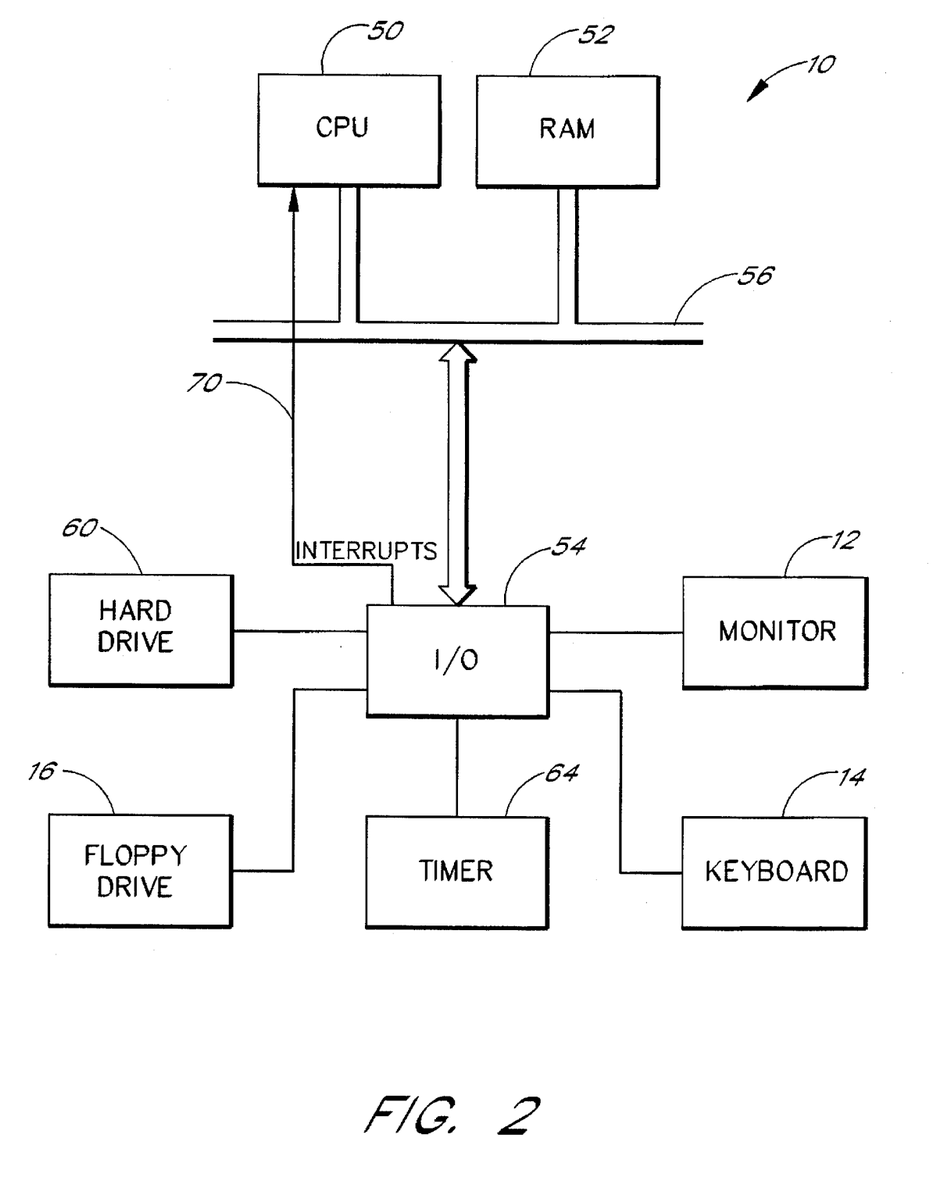
FIG. 2 is a simplified block diagram of a computer system, into which the present invention may be incorporated.

FIG. 2 is a highly simplified block diagram of the computer system 10 showing a microprocessor or central processing unit (CPU) 50, a random access read/write memory (RAM) subsystem 52, and an input/output (I/O) subsystem 54, connected to a common system bus 56. A number of peripheral devices, such as, for example, a hard disk drive 60, the floppy disk drive 16, a timer subsystem 64, the keyboard 14 and the monitor 12, communicate with the microprocessor 50 via the I/O subsystem 54 and the system bus 56. In addition, various components connected to the I/O subsystem 54 generate interrupts which are communicated to the microprocessor 50 via one or more interrupt lines 70. One skilled in the art will appreciate that the I/O subsystem 54 may include a number of different buses, such as, for example, a peripheral component interconnect (PCI) bus, an Industry Standard Architecture (ISA) bus, a video local bus, and the like, which are not shown in FIG. 2. The computer system 10 is configured in a conventional manner and is not altered in any manner in order to incorporate the present invention other than to load and run the program described herein. Thus, it is not believed to be necessary to further describe the basic structure or operation of the computer system 10.

The preferred embodiment of this invention is a Terminate and Stay Resident (TSR) computer program called "Tracker". The Tracker program is loaded automatically by the computer's DOS operating system whenever the computer is booted. Because the Tracker program is a TSR, it can operate while other computer programs are running. Moreover, the Tracker program's operation is invisible to the user, so that the user will not be alerted to its presence or tempted to disable it.

Briefly described, the Tracker program monitors the computer system's timer and, at predetermined intervals (by default, every thirty minutes), stores the amount of time intervals the computer system has been operating in a log file located on the computer's hard drive. The Tracker program also logs the number of times the computer system has been booted. After a sufficient period of time has been monitored, or after a sufficient number of boots have been logged, the Tracker program disables its logging function and furthermore prevents itself from running as a logger when the computer is booted in the future. In an alternative embodiment, the Tracker program also stores the time and date when the computer system is first booted and the log file is created.

The Tracker program has three main components: (1) an Initialize function, which is called when the program is first loaded, and which sets up the program's counters and prepares the program to terminate and stay resident; (2) a DosTimer function, which intercepts and counts the number of DOS timer interrupts issued by the computer system's timer; and (3) a DosIdle function, which intercepts the DOS idle interrupt and, when enough timer ticks to reach one interval have been counted, updates a log file, located on the computer's hard disk, to reflect the total time the computer has been operating.

The Tracker program is designed to accept one (optional) command-line argument. This argument can be either a number representing a valid interval time in minutes, or one of the commands DELETE, LOCK, RESET, OR SHOW. (The effect of these commands will be described below.) If no argument is provided or if a valid interval time is provided, the Tracker program terminates but stays resident, and begins logging the time the computer is on. (If no argument is given, the default interval time of thirty minutes is used.) If, on the other hand, a command is given, the Tracker program performs the requested function and terminates, but does not stay resident.

In the preferred embodiment, the computer system 10 is an IBM-PC compatible computer using the DOS operating system. As is well known to most DOS users, when such a computer is turned on or restarted ("booted"), the DOS operating system executes a batch command file called "AUTOEXEC.BAT", if such a file exists. The AUTOEXEC.BAT file typically performs basic startup functions such as loading device drivers and setting up the DOS environment. In the preferred embodiment, the computer seller configures the AUTOEXEC.BAT file so that it executes the Tracker program (which is located on the computer's hard disk) without a command-line argument. In this way, the Tracker program loads and starts running, using the default interval time, each time the computer is booted. Alternatively, the computer seller may configure the AUTOEXEC.BAT file so that it executes the Tracker program using an interval time other than the default interval time.

For the reader's aid in following the description below, the Tracker program uses the following variables:

BootCount: the number of boots counted.

IntervalCount: the number of intervals counted.

ManualLock: a flag that, when set, stops the Tracker program from operating.

AutoLock: another flag that, when set, stops the Tracker program from operating.

Process: another flag that, when set, stops the Tracker program from operating.

DoUpdateFile: a flag that, when set, causes the Tracker program to update the log file.

IntervalMinutes: the number of minutes per interval.

IntervalTicks: the number of timer ticks per interval.

TicksLeft: the number of timer ticks remaining before IntervalTicks ticks have been counted.

MaxBoots: the maximum number of boots to count.

MaxIntervals: the maximum number of intervals to count.

Figures 3, 3A:
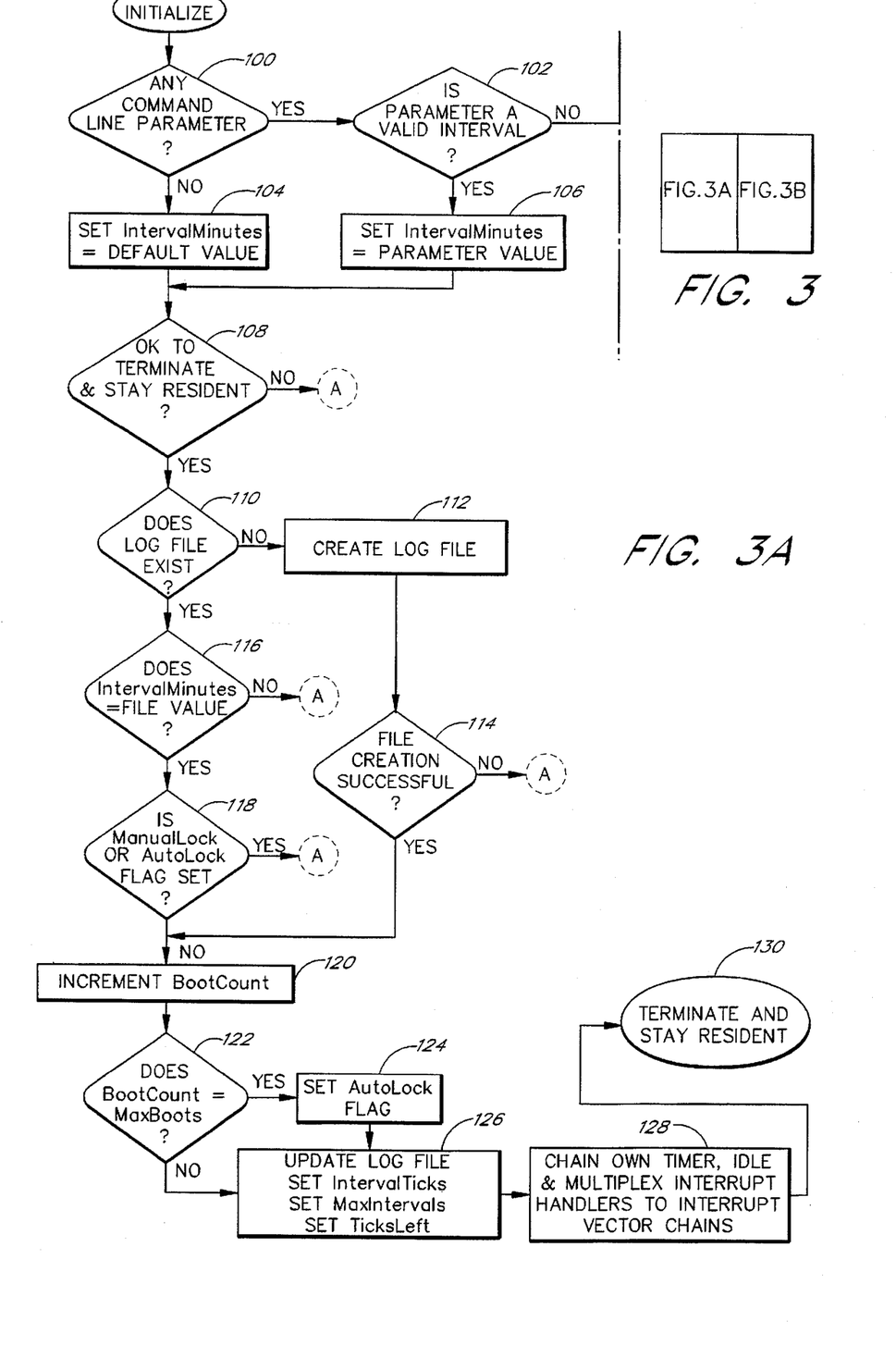
FIGS. 3A and 3B are flowcharts describing the operation of the preferred embodiment's Initialize function.
FIG. 3 shows the relationship between FIGS. 3A and 3B.
Figure 3B:
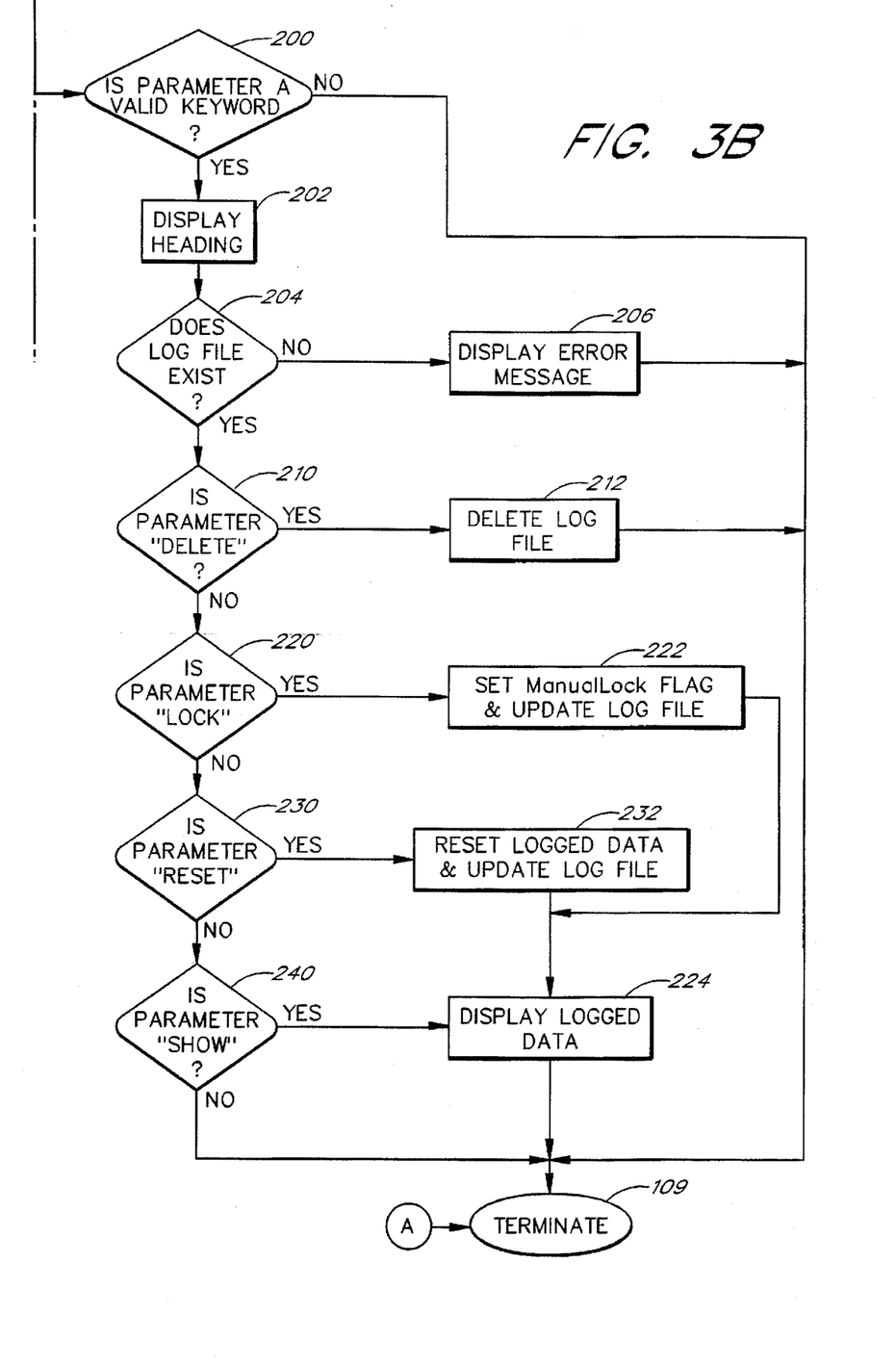

FIGS. 3A and 3B illustrate the Tracker program's Initialize function, which is called as soon as the Tracker program has been loaded into memory and executed. Beginning at a step 100 in FIG. 3A, the Initialize function checks whether any command-line parameters were specified. If so, the parameter is tested at a step 102 to determine if it is a number representing an interval time, in minutes. In the preferred embodiment, the interval time is in the range 30 to 60 minutes, although other ranges may be used. An interval of 30 minutes causes the computer system to be activated only twice per hour to update the log file. Thus, in a system where the disk drive is powered down during periods of inactivity by the user, the disk drive is powered up infrequently to update the log file such that the user is not as likely to notice the disk activity than if the log file is updated more often.

On the other hand, interval times longer than 60 minutes significantly affect the Tracker program's accuracy in logging operating time. This is because whenever the computer is shut down or rebooted, the Tracker program will not record the fraction of an interval that it has already counted. Thus, the Tracker program consistently underestimates the amount of time the computer has been used, by an amount proportional to the interval time. Longer interval times, therefore, lead to larger underestimations.

If no argument is specified, the Initialize function sets IntervalMinutes to the default interval time of 30 minutes at a step 104. If a valid interval was specified, the Initialize function sets IntervalMinutes to the specified interval time at a step 106. Next, at a step 108, the Initialize function tests whether it is possible for the Tracker program to terminate and stay resident (TSR). The Initialize function performs this test in a manner well known in the art by using the DOS multiplex interrupt (2F hex) to determine whether Microsoft® Windows™ is executing and whether the Tracker program is already resident. If the Initialize function determines that the Tracker program cannot terminate and stay resident, the program terminates at a step 109 (FIG. 3B).

The Initialize function next tests at a step 110 whether the Tracker log file exists. In the preferred embodiment, the log file is identified by the name "~AST.LOG", and is stored as a hidden file located in the local hard drive's root directory (usually the "C:\" directory). The log file is hidden so that the user will not notice it and will not be tempted to alter it.

If the log file does not exist, the Initialize function creates the log file at a step 112. The log file contains information for the following variables: BootCount, IntervalCount, IntervalMinutes, ManualLock, and AutoLock. In an alternative embodiment, the log file also includes the date and time when the log file was first created when the consumer first booted the computer system. As discussed above, the log file is created so that it is a hidden file. When first created, the log file variables are all zeroed, except the IntervalMinutes variable, which is set to the current IntervalMinutes value (either the default of thirty minutes, or whatever interval time was specified in the command-line argument). The Initialize function further checks at a step 114 whether its attempt at creating the log file was successful. If not, the program terminates at the step 109 (FIG. 3B).

If the log file does exist, the Initialize function loads the data from the log file into its variables. Initialize then ensures at a step 116 that the log file's IntervalMinutes value is the same as the specified (or default) IntervalMinutes value. This check is necessary because the Tracker program logs the number of intervals counted, not the number of minutes counted, and therefore if the Tracker program is directed to log at intervals different from the log file's interval time, the IntervalCount value will have an indeterminate meaning. For this reason, if the log file's Interval- Minutes value does not agree with the current IntervalMinutes value, the program terminates at the step 109 (FIG. 3B).

If the log file does exist and if the log file's IntervalMinutes value agrees with the current IntervalMinutes value, the Initialize function also ensures at a step 118 that neither its ManualLock flag nor its AutoLock flag is set. Either of these flags directs the Tracker program to stop operating. Therefore if either flag is set, the program terminates at the step 109 (FIG. 3B).

If the program proceeds through the foregoing tests without terminating, the Initialize function increments the BootCount variable at a step 120, and then at a step 122 checks whether a predetermined maximum number of boots (MaxBoots) have been counted. In the preferred embodiment, MaxBoots is set to 1,500, representing the assumption that after 1,500 boots, the system is sufficiently used that further usage tracking is unnecessary. If MaxBoots (e.g., 1,500) boots have been counted, the Initialize function sets the AutoLock flag at a step 124.

In any case, the Initialize function then updates the log file at a step 126 so that it contains the current set of logged variables. At this time, the Initialize function also calculates the number of ticks required per interval (IntervalTicks), and sets the TicksLeft variable to this number. IntervalTicks is equal to IntervalMinutes multiplied by 1,091, which closely approximates the 1,090.9 ticks per minute for an IBM-compatible computer's system timer when the computer system is executing under DOS. The Initialize function also calculates MaxIntervals, which sets the maximum number of intervals the Tracker program will count before disabling itself. In the preferred embodiment, MaxIntervals is equal to 90,000 minutes (1,500 hours) divided by IntervalMinutes, so that the Tracker program will log time for the first 1,500 hours the computer is on, and then stop.

Finally, at a step 128 the Initialize function chains the Tracker program into the DOS timer, idle, and multiplex interrupt vectors, and then terminates and stays resident at a step 130. The process for hooking a TSR program into interrupt vectors is well-known in the art and need not be described here. It is necessary only to note that the Tracker program's DosIdle function is chained into the DOS idle (28 hex) interrupt vector, and that the Tracker program's DosTimer function is chained into the DOS timer (08 hex) interrupt vector, so that the DosIdle function is called whenever the DOS system is idle, and the DosTimer function is called at each DOS timer tick.

As illustrated in FIG. 3B, if the command-line parameter passed to the Tracker program was not a valid interval, the Initialize function checks at a step 200 whether the parameter is a valid keyword. As discussed above, valid keywords are DELETE, LOCK, RESET, and SHOW. If the parameter is not a valid keyword, the program terminates at the step 109.

If on the other hand the parameter is a valid keyword, the Initialize function displays a brief heading giving the Tracker program name and copyright information, and then determines whether the log file exists at steps 202 and 204. If no log file exists, the Initialize function displays an error message at a step 206 and then the program terminates at the step 109.

If the log file exists at the step 204, then the Initialize function responds to the keyword command in the command line as follows.

If the DELETE keyword is found in the command line at a step 210, the Initialize function deletes the log file at a step 212 and then terminates at the step 109.

If the LOCK keyword is found in the command line at a step 220, the Initialize function sets the ManualLock flag and updates the log file at a step 222. Then, at a step 224, the Initialize function displays the logged data. The Initialize function then terminates at the step 109.

If the RESET keyword is found in the command line at a step 230, the Initialize function zeroes the BootCount, IntervalCount, ManualLock, and, AutoLock variables and updates the log file at a step 232. The Initialize function then displays the logged data at the step 224 and then terminates at the step 109.

If the SHOW keyword is found in the command line at a step 240, then, at the step 224, the Initialize function displays the number of hours logged (IntervalCount times IntervalMinutes divided by 60), the number of boots counted, the IntervalMinutes period, and whether the ManualLock or AutoLock flags are set. The Initialize function then terminates at the step 109.

These keyword commands are not published as part of the system documentation, and are intended to be used only by the seller prior to shipping a new system or when a system is returned.

If the Tracker program has succeeded in terminating and staying resident, the Tracker program's DosTimer and DosIdle functions will be called whenever a system timer interrupt or DOS idle interrupt occurs, respectively.

Figure 4:
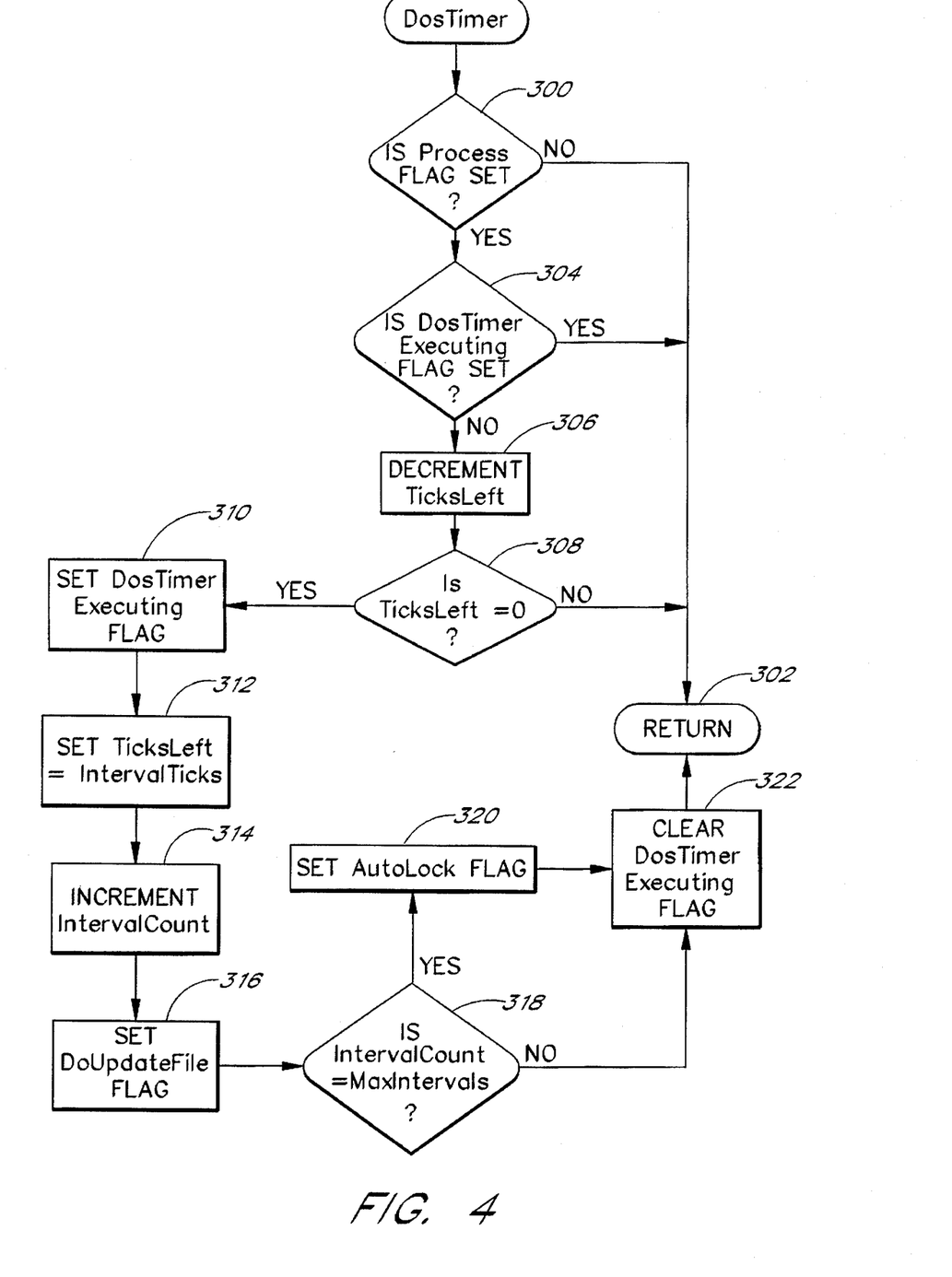
FIG. 4 is a flowchart describing the operation of the preferred embodiment's DosTimer function.

The DosTimer function counts the number of timer ticks issued by the system timer. As illustrated in FIG. 4, the DosTimer function's first operation is to check the Process flag at a step 300 to determine if the Tracker program is still intended to operate. This check is made early to ensure that, if the Tracker program should cease operation (if, for example, the requisite 1,500 hours logged have been reached), the DosTimer function exits quickly. Clearly, since the DosTimer function is called 1091 times each minute, it is advantageous for the function to quit as soon as possible if its continued operation is unnecessary. If the Process flag is not set, the DosTimer function returns control to the interrupt calling function at a step 302.

If the Process flag is set, the DosTimer function then checks an internal flag (DosTimerExecuting) at a step 304 to determine if the DosTimer function has already been called. Although it is an unlikely event, it is possible for the DosTimer function to be called while the function is executing. This can occur if the system timer issues an interrupt during the DosTimer function's execution. For this reason, the DosTimer function must ensure that it is not already active, before continuing to execute. If the DosTimerExecuting flag is already set, the DosTimer function returns control to the interrupt calling function at the step 302.

If the DosTimerExecuting flag is not set, the DosTimer function then decrements the TicksLeft variable at a step 306, and then checks whether it has reached zero yet at a step 308. Because TicksLeft was initialized to the value of IntervalTicks, when TicksLeft reaches zero, one interval has elapsed. If the TicksLeft variable is not zero, the DosTimer function returns control to the interrupt calling function at the step 302. If TicksLeft is zero, the DosTimer function sets the DosTimerExecuting flag at a step 310, resets TicksLeft to IntervalTicks at a step 312, increments IntervalCount at a step 314, and then sets the DoUpdateFile flag at a step 316.

Next, the DosTimer function checks whether IntervalCount has reached MaxIntervals at a step 318. If it has, the DosTimer function sets the AutoLock flag at a step 320, which will (as discussed below) stop the Tracker program from operating further, after the log file has been updated one last time. The DosTimer function then clears the Dos- TimerExecuting flag at a step 322 and returns control to the interrupt calling function at the step 302.

If at the step 318, the IntervalCount has not reached MaxIntervals, the DosTimer function clears the DosTimerExecuting flag at the step 322 and returns control to the interrupt calling function at the step 302.

Figure 5:
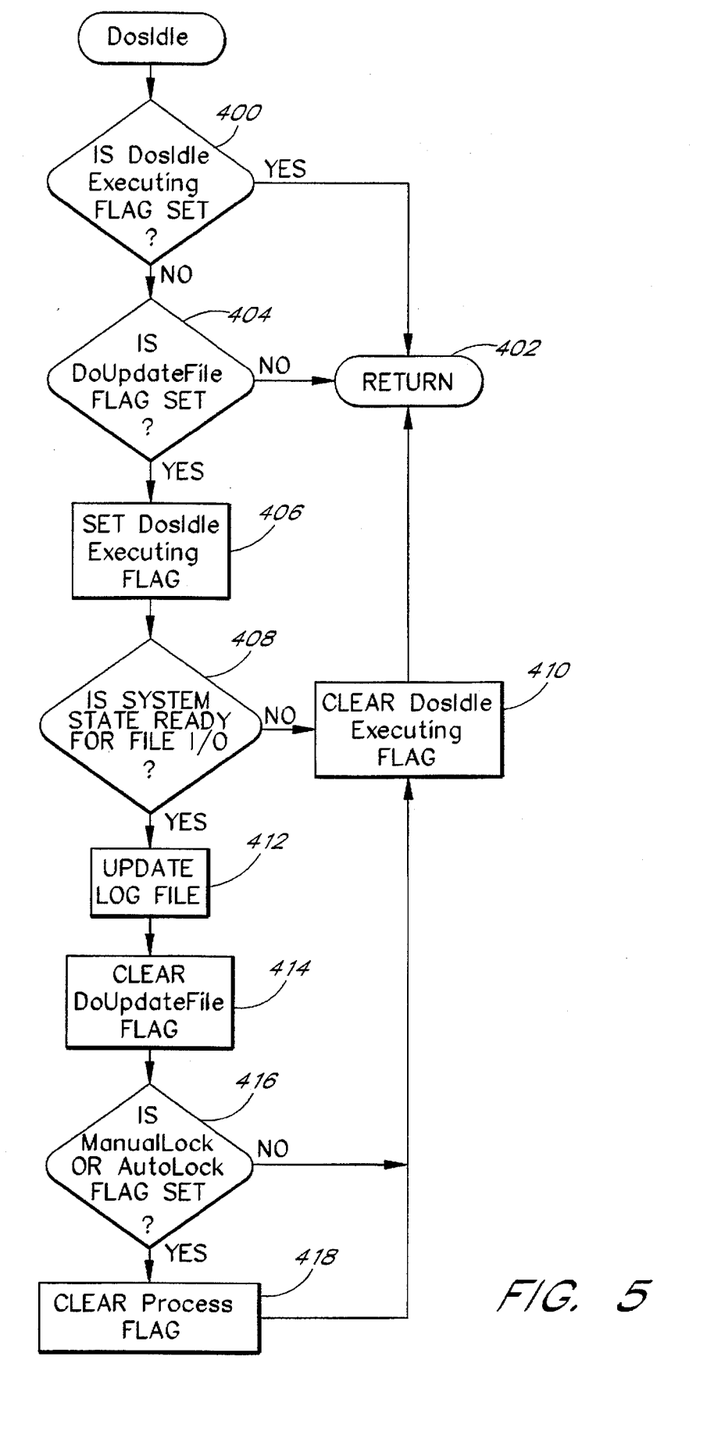
FIG. 5 is a flowchart describing the operation of the preferred embodiment's DosIdle function.

FIG. 5 illustrates the DosIdle function. The DosIdle function is called in response to a DOS idle interrupt, which is issued whenever DOS is idle. Like the DosTimer function, the DosIdle function first checks an internal flag (DosIdleExecuting) at a step 400 to ensure that it is not already executing. If it is already executing, the DosIdle functions returns control to the interrupt calling function at a step 402. If it is not already executing, the DosIdle function checks whether the DoUpdateFile flag is set at a step 404. Because the DosIdle function's only purpose is to update the log file, it need only operate when DoUpdateFile has been set.

If the DoUpdateFile flag is set, the DosIdle function prepares for operation by setting the DosIdleExecuting flag at a step 406, and then checks the DOS system at a step 408 to ensure that it is ready to accept a write request to the system's local hard drive. As those with skill in the art will appreciate, this check is performed by checking the DOS CriticalError flag (whose location is determined at initialization time via a DOS interrupt (21 hex) function call) to ensure that no critical error has occurred in the DOS system.

If a DOS critical error would prevent the log file writing operation, the DosIdle function clears the DosIdleExecuting flag at a step 410 and then terminates by returning control to the interrupt calling function at the step 402. If not, the DosIdle function updates the log file, by writing to it the BootCount, IntervalCount, IntervalMinutes, ManualLock, and AutoLock values at a step 412. The DosIdle function then clears the DoUpdateFile flag at a step 414.

The DosIdle function next checks whether either the ManualLock or AutoLock flag is set at a step 416. If neither flag is set, the DosIdle function clears the DosIdleExecuting flag at a step 410 and returns at the step 402. If either flag is set, the DosIdle function clears the Process flag (which will prevent the DosTimer function from further counting timer ticks) at a step 418, clears the DosIdleExecuting flag at the step 410, and returns control to the interrupt calling function at the step 402.

The Tracker program thus provides a simple way of keeping track of the number of boots and the total operating time of the computer system 10 in a manner generally transparent to the system's user. Thus, if the computer system 10 is returned to the seller, the seller can readily determine, by examining the log file (i.e., by executing the Tracker program with the SHOW parameter in the command line), whether the computer system 10 has been used, and approximately how much it has been used.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A system for tracking the amount of time a computer has been operated after delivering the computer to an end user, said system comprising:

a random access memory which stores data and executable programs while said computer is operating;

a source of periodic interrupts to said computer;

a non-volatile data storage device;

a log file located on said non-volatile data storage device, said log file containing data representing the mount of time said computer has been on; and a time logging program which is loaded into memory and which is activated in background mode each time said computer is booted, said time logging program counting said timer interrupts and updating said data in said log fie when a predetermined number of said timer interrupts has been counted, said log file thereby storing a count representing a time duration for which said computer is operated, and wherein said time logging program ceases operating after it has counted a predetermined number of timer interrupts.

2. A system for tracking the amount of time a computer has been operated after delivering the computer to an end user, said system comprising:

a random access memory which stores data and executable programs while said computer is operating;

a source of periodic interrupts to said computer;

a non-volatile data storage device;

a log file located on said non-volatile data storage device, said log file containing data representing the amount of time said computer has been on; and a time logging program which is loaded into memory and which is activated in background mode each time said computer is booted, said time logging program counting said timer interrupts and updating said data in said log file when a predetermined number of said timer interrupts has been counted, said log file thereby storing a count representing a time duration for which said computer is operated, and wherein said time logging program also counts the number of times said computer system is booted.

3. A system for tracking the amount of time a computer, which has a memory and a non-volatile data storage device and which issues timer interrupts, is on, comprising:

a log file located on said non-volatile data storage device, said log file containing data representing the amount of time said computer has been on; and a background executing program which is loaded into said memory and activated each time said computer is booted, said background executing program intercepting and counting said timer interrupts, said background executing program updating said log file's data when a predetermined number of said timer interrupts has been counted, and wherein said time logging program ceases operating after it has counted a predetermined number of timer interrupts.

4. A system for tracking the amount of time a computer, which has a memory and a non-volatile data storage device and which issues timer interrupts, is on, comprising:

a log file located on said non-volatile data storage device, said log file containing data representing the amount of time said computer has been on; and a background executing program which is loaded into said memory and activated each time said computer is booted, said background executing program intercepting and counting said timer interrupts, said background executing program updating said log file's data when a predetermined number of said timer interrupts has been counted, and wherein said time logging program also counts the number of times said computer system is booted.

* * * * *